United States Patent
Byrd et al.

(10) Patent No.: US 8,147,943 B1
(45) Date of Patent: Apr. 3, 2012

(54) REPLACEABLE IMPACT RESISTANT THERMAL PROTECTION SYSTEM

(75) Inventors: Larry W. Byrd, Huber Heights, OH (US); Victor M. Birman, Chesterfield, MO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 272 days.

(21) Appl. No.: 12/411,598

(22) Filed: Mar. 26, 2009

(51) Int. Cl.
  *B32B 3/24* (2006.01)
  *B64G 1/58* (2006.01)

(52) U.S. Cl. ............ 428/99; 428/120; 428/49; 428/223; 244/159.1; 244/121

(58) Field of Classification Search ............ 428/49, 428/99, 120, 223; 244/159.1, 171.7, 121; 52/787.11, 386
See application file for complete search history.

(56) References Cited

U.S. PATENT DOCUMENTS 4,713,275 A * 12/1987 Riccitiello et al. .............. 428/76

* cited by examiner

*Primary Examiner* — Alexander Thomas
(74) *Attorney, Agent, or Firm* — AFMCLO/JAZ

(57) ABSTRACT

A thermal protection system capable of withstanding impact loads without a detrimental effect to its main function, i.e. a protection of the vehicle from high temperature during re-entry or flight in the atmosphere. The system consists of the outer ceramic matrix composite shield, a ceramic tile sandwiched between the shield and the skin of the vehicle and fasteners joining the system and the protected structure. The ceramic matrix composite fasteners are capable of working in the same high-temperature environment as the rest of thermal protection system. They are also strong and stiff due to the presence of ceramic fibers. Cracks in the outer shield produced by impact cannot propagate into the ceramic tile since the shield and tile materials are discontinuous along the interface. The tile cannot disintegrate from the vehicle since it is pressed to its skin by the outer shield. The system can easily be disassembled for inspection and/or repair.

4 Claims, 3 Drawing Sheets

REPLACEABLE IMPACT RESISTANT THERMAL PROTECTION SYSTEM

RIGHTS OF THE GOVERNMENT

The invention described herein may be manufactured and used by or for the Government of the United States for all governmental purposes without the payment of any royalty.

BACKGROUND OF THE INVENTION

The invention relates to replaceable impact resistant thermal protection systems for aerospace vehicles.

FIELD OF THE INVENTION

Thermal protection systems are critical for space and hypersonic vehicles subjected to extremely high surface temperature during flight (hypersonic planes) or re-entry (space vehicles). The solution to the thermal protection problem has been found in the form of ceramic tiles, such as those used in the Spate Shuttle Orbiter. However, the existing tiles and available thermal protection system cannot guarantee sufficient safety of the space vehicle. This was reflected in the recent history, including a tragic accident of Space Shuttle Columbia on Feb. 1, 2003 that burned during re-entry due to damage to the ceramic tiles induced by pieces of the insulation foam that fell from the bipod ramp section of the external tank during take-off.

Thermal protection systems presently used by the shuttle fleet include reusable surface insulation tiles, known as "black tiles" manufactured from porous silica fibers within reaction cured glass. The leading edge of the Shuttle which is subjected to up to 3000° F. during reentry is manufactured from a reinforced carbon-carbon whose outer surface is converted to SiC to enhance the oxidation resistance. Both these systems are manufactured as a monolithic structure, i.e. a crack, once initiated, can propagate throughout the panel, ultimately resulting in catastrophic failure.

The thermal protection system of the present invention is capable of protecting structures of reentry space vehicles and hypersonic planes from high intensity heat flux and elevated temperature applied at the exposed surface for prescribed durations of time, while also possessing significant impact resistance. The system can be rapidly disassembled to replace or inspect the outer shield section. Accordingly, the purpose of the invention is to provide a thermal protection system that can withstand damage due to impact without compromising thermal protection capabilities, provide ease of replacement of outer sections of a thermal protection system for inspection or replacement, prevent disintegration of the ceramic thermal protection tiles from the vehicle, and use fasteners that have high strength and stiffness, while also capable of withstanding the same thermal regime as the ceramic elements of the thermal protection system.

RELATED ART

Attachment joints of the thermal protection system panels to the substructure (metallic skin of the vehicle) are often bolted, though this approach cannot be used in the sections with a difficult access from within the vehicle. An alternative method based on integral tendons and mortises which enable the external replacement of fasteners is disclosed by Riedell (U.S. Pat. No. 6,827,312). Another attachment method is disclosed by Riccitiello, et al (U.S. Pat. No. 4,713,275) which employs bolted tabs or clips located on the side of the insulation tiles or shells. An advantage of the present invention over Riccitiello is that the outer thermal protective shield is firmly attached directly to the space vehicle's outer metallic skin with fasteners such as hex nuts which serves to support the inner tile shield which in Riccitiello is attached only with an adhesive material. A further advantage of the present invention over that disclosed in Riccitiello is the greater ease of replacing the outer shield tiles. The outer protective shield tiles must necessarily be assembled very close together. Riccitiello requires access to the sides of the inner tile shield in order to attach the outer tile shield. The present invention does not require access to the sides of the inner tile shield because the attachment rods pass perpendicularly through the inner tile shield and outer metallic skin of the spacecraft. Additionally, in order to remove a damaged outer tile shield, the present invention requires a technician to simple remove the inner fasteners such as hex nuts which releases the outer tile shield. Thus, a damaged outer tile shield may be readily replaced without affecting adjacent protective tiles.

SUMMARY OF THE INVENTION

The present invention comprises a thermal protection system for space and hypersonic vehicles capable of withstanding high velocity impact during takeoff and reentry into the atmosphere (space vehicles) and during hypersonic flight (hypersonic vehicles) without immediate failure. As a result of this impact survivability, the vehicle would survive the flight and the necessary repairs can be made upon its safe return. The thermal protection system can also survive low velocity impact when the vehicle is on the ground, while still protecting the main thermal protection element. The design is based on dividing the thermal protection system into two components pressed against each other by fasteners but without a continuous material connection along the interface. Accordingly, impact-generated cracks in the outer shield (ceramic matrix composite panel) stop at the surface of this shield adjacent to the internal component (ceramic tile) and do not propagate into this component that serves as a major heat protection element. This ensures that even if the outer shield is damaged, a catastrophic failure such as occurred in Space Shuttle Columbia would not occur in the present design. The other advantage of this invention is an easy access to a damaged external shield of a thermal protection system for its quick replacement.

It is therefore an object of the present invention to provide a discontinuous thermal protection system with the outer ceramic matrix composite CMC shield capable of both withstanding external impacts (with or without cracking) as well as surviving flight thermal loads and the inner ceramic the capable of withstanding prescribed thermal loads for a prescribed time interval without conducting a dangerous amount of heat to the main structure (skin) of the vehicle. Ceramic matrix fasteners connecting the thermal protection system to the main structure have high thermal resistance, i.e. they can withstand the same temperature as the CMC shield and ceramic the of a thermal protection system. These fasteners consist of ceramic fibers embedded in a ceramic matrix, providing them with sufficient strength and stiffness to guarantee a safe assembly.

It is another object of this invention to provide for a simple method of disassembly of two components of thermal protection system, namely the outer shield and the inner tile separating them from the main structure (metallic skin) of the vehicle.

It is another object of this invention to provide for a reliable attachment of the ceramic tile to the structure (metallic skin)

of the air vehicle during the flight through the fasteners pressing the outer shield to the tile and furthermore, pressing the tile to the skin of the air vehicle avoiding its detachment during the flight.

It is another object of this invention to provide a design of the outer shield incorporating the fasteners used to join the shield and the inner ceramic tile to the structure (skin) of the vehicle. The fasteners being manufactured together with the outer shield, the integrity of the design is preserved.

It is another object of this invention to use ceramic fasteners (ceramic fibers embedded within ceramic matrix), i.e. materials capable to withstand the same high temperatures as those in the region of the interface between the outer shield and the ceramic tile. At the same time, these ceramic fasteners have thermal conductivity comparable to those of the outer shield and the tile, i.e. the thermal protection of the structure (skin) of the vehicle is not compromised.

It is another object of this invention to eliminate a need in the inspection of ceramic tiles between the flight, reducing the required maintenance to either an inspection or a replacement of the outer shield.

These and other objects of the invention are achieved by the method of manufacture and assembly of thermal protection system that becomes apparent as the description of the representative embodiments proceeds.

BRIEF DESCRIPTION OF THE DRAWINGS

FIG. 4 is a perspective view of the ceramic inner tile showing the holes through which the connecting rods pass through.

FIG. 5 is a side view of the ceramic inner tile showing the holes through which the connecting rods pass through.

DETAILED DESCRIPTION

Figure 1:
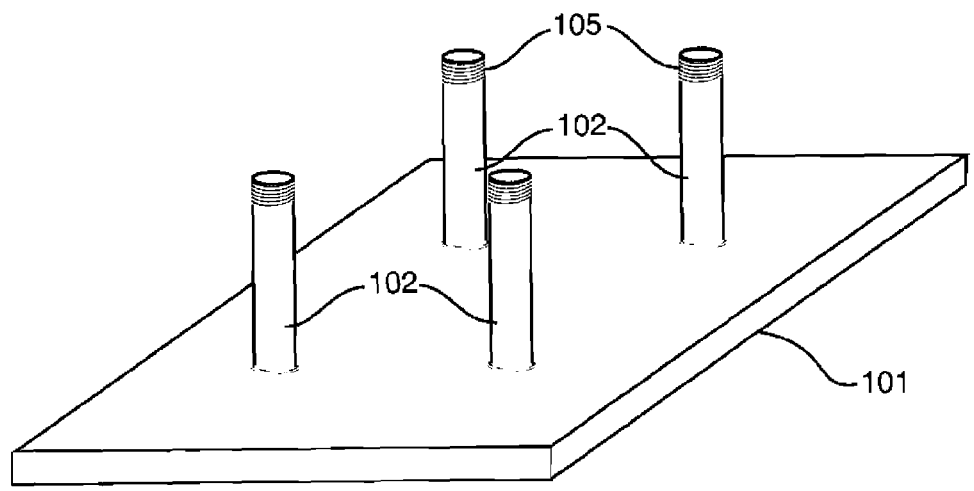
FIG. 1 is a perspective view of the outer shield.
Figure 2:
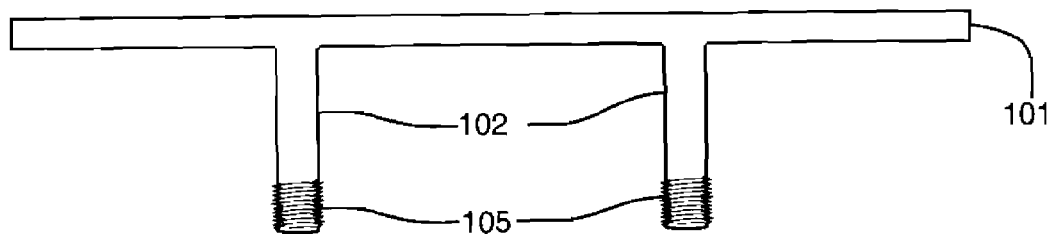
FIG. 2 is a side view of the outer shield.

FIG. 1 is a drawing illustrating a CMC outer shield of the thermal protection system after the manufacturing process. The shield includes a panel cured as either a woven CMC or a laminated CMC 101 and four rods (102) of circular cross section protruding from the panel and perpendicular to its surface. The thread (105) is cut at the ends of the rods after curing. FIG. 2 shows a side view of the outer shield.

Figure 3:
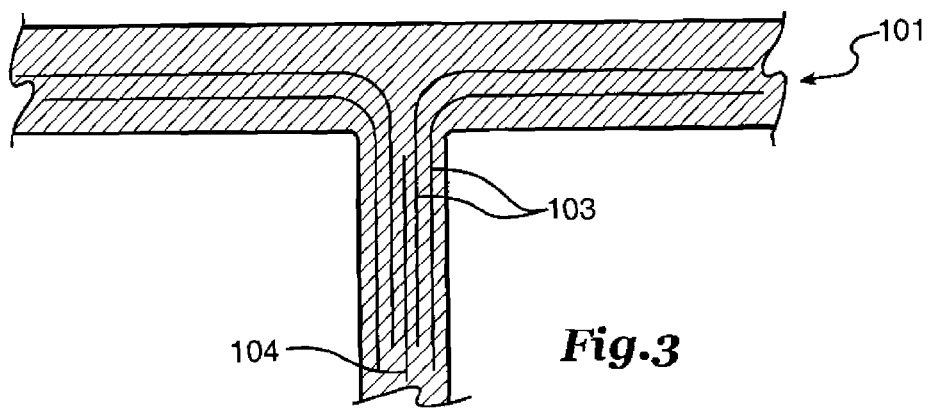
FIG. 3 is a cross section view of a rod protruding from the shield showing ceramic fibers within the rod.
Figure 4:
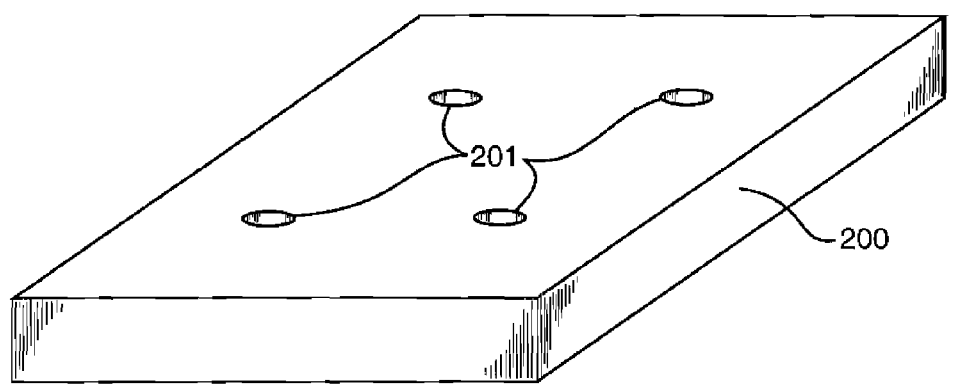
Figure 5:
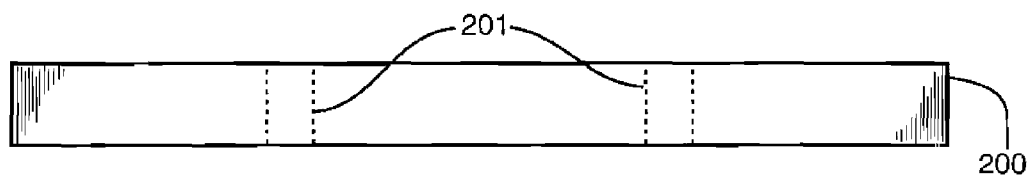

FIG. 3 shows a rod of a circular cross section protruding from the shield and ceramic fibers (103) within this rod that provide necessary stiffness and strength of the rod. The fibers (103) are embedded in a ceramic matrix (104). FIG. 4 is a drawing of the ceramic tile (200) with 4 openings (201) of diameter suitable for protruding circular rods (102) that are to be inserted in these openings during assembly. FIG. 5 is a side view of the ceramic tile (200) with the contour of openings (201) shown in broken lines.

Figure 6:
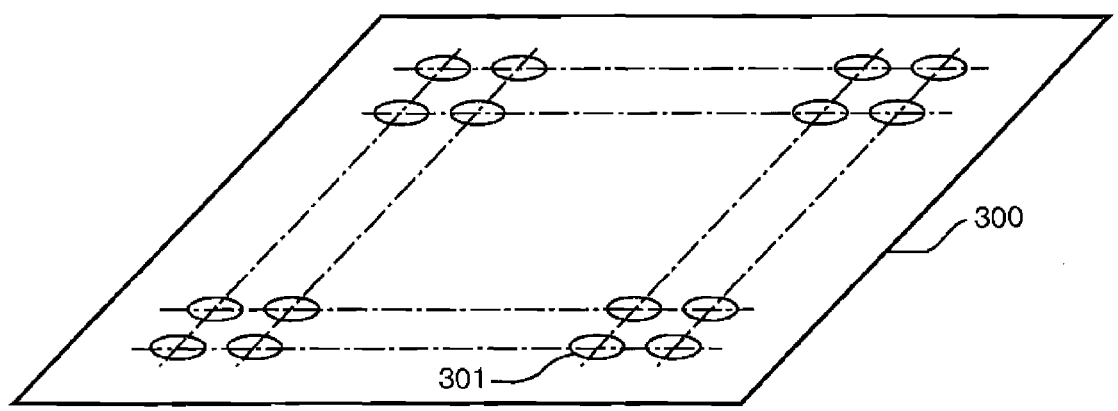
FIG. 6 is a perspective of the vehicles outer metallic skin showing holes for four adjacent thermal protection system sections.

FIG. 6 is a view of the main structure (skin) of the vehicle (300) showing holes for adjacent thermal protection system sections. Four holes for a single thermal protection system panel are identified on the drawing (301). The diameter of holes (301) must be chosen to satisfy the requirement that rods (102) are to be inserted in these openings during assembly.

Figure 7:
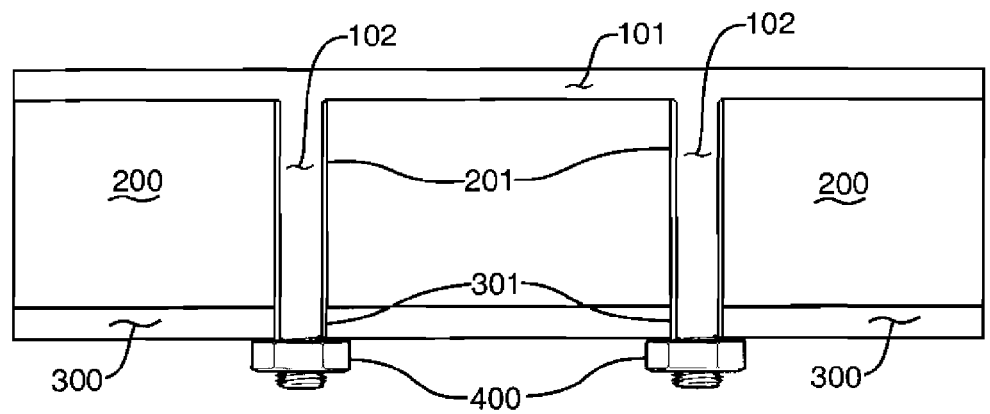
FIG. 7 is a side view of the assembled thermal protection system panel showing the inner ceramic tile sandwiched between the outer metallic skin and the outer shield.

FIG. 7 is a drawing of a side view of the assembled thermal protection system panel joined to the structure (skin) of the vehicle. Shown are skin (300) with the openings (301), ceramic tile (200) with the openings (201), the outer shield (101) with protruding rods (102) drawn through the holes in the tile and skin of the vehicle, and nuts (400) keeping the assembly joined during the flight. Once the nuts are tightened, thermal protection system is secured to the structure and cannot be separated from it, even if the shield is cracked due to an impact. If the shield has to be replaced due to damage or for an inspection, the nuts should be removed and the disassembly is easily achieved.

Figure 8:
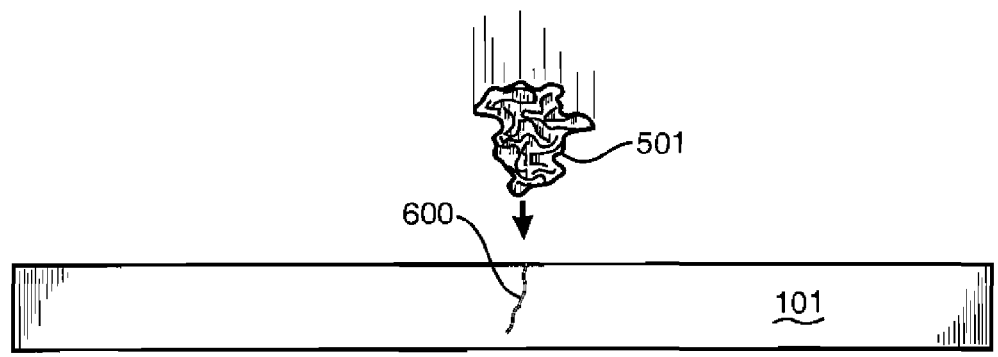
FIG. 8 illustrates an impact object hitting the outer shield and a through-the thickness crack developed in the shield as a result of the impact.
Figure 9:
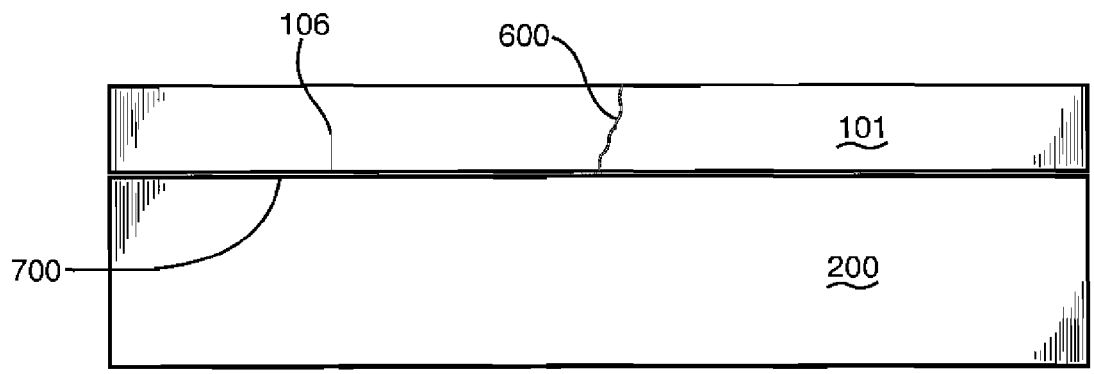
FIG. 9 shows the crack stopping at the inner surface of the outer shield and not propagating through the ceramic inner tile.

FIG. 8 is a drawing illustrating an impact object (501) hitting the shield (101) and a through-the thickness crack (600) developed in the shield as a result of this impact. FIG. 9 is an illustration of the beneficial effect of two-sectional thermal protection system. Crack (600) reaches the interface between shield (101) and ceramic tile (200). As a result of an opening between the shield and tile (700), the crack stops at the inner surface of the shield (106), while the tile remains intact.

Many alterations and modifications may be made by engineers and designers without altering the scope and spirit of the invention. Hence the illustrated embodiment should be understood as an example only and it does not represent a limit to the claims made in this patent. For example, the bolted connection formed by protruding rod (102), thread (105) and nut (400) may be replaced with a magnetic connection, etc. Obvious substitutions within the limits of available engineering art should be understood being within the scope of this invention.

The thermal protection system of the present invention provided the following advantages:

The thermal protection system prevents cracks due to impact from propagating into the major heat-resistance element, i.e. the ceramic tile. Accordingly, impact incurred during the flight does not result in a catastrophic failure during the same flight.

The outer ceramic matrix composite shield of the invented thermal protection system provides an additional thermal protection element, besides absorbing the energy of impacts. Therefore, this shield serves a dual function both providing impact resistance of thermal protection system and improving its thermal protection capacity. The absence of material contact between the outer shield and the inner tile eliminates the danger of cracks propagating from the shield into the tile.

The ceramic fiber reinforced ceramic fasteners enable an easy disassembly of the system for repair or inspection. The presence of ceramic fibers in the fasteners increases their strength and stiffness. At the same time, using ceramic materials guarantees a reliable work of such fasteners under loading, without compromising thermal protection capacity of the system.

Furthermore, there is a need to replace only the outer shield in case of damage, while the inner ceramic tile remains intact. The present invention serves to prevent ceramic tiles from disintegrating from the vehicle since the tiles are pressed to the skin of the vehicle by the outer shield that is in turn connected to the vehicle by four fasteners.

An alternative approach to fastening thermal protection system can be based on magnetic activation of a release mechanism.

Although this invention has been described with respect to certain preferred embodiments, various other embodiments and various changes and modifications to the disclosed embodiment(s) will become apparent to those skilled in the art. All such other embodiments, changes, and modifications are intended to come within the spirit and scope of the appended claims.

What is claimed is:

1. A reusable thermal protection system for attaching to an outer skin of a vehicle, said system comprising:
   an outer ceramic composite shield having an outer shield surface and an inner shield surface, wherein said inner shield surface is to be oriented toward the vehicle when in use;
   a plurality of integral extensions having a proximal end and a distal end, wherein said proximal end is connected to said inner shield surface and said distal end extends away from said inner shield surface such that said integral extensions are disposed substantially perpendicular to said inner shield surface;
   an inner ceramic composite tile having a first tile surface and a second tile surface, wherein said first tile surface and said second tile surface define a plurality of apertures extending through said first tile surface and said second tile surface such that said apertures are aligned with said integral extensions and wherein said integral extensions extend fully through said first tile surface and said second tile surface such that said second tile surface is to be oriented toward the vehicle when in use and such that said outer ceramic composite shield and said inner ceramic composite tile are to be substantially parallel to one another and to the vehicle when in use; and
   an attachment means on said distal end of said integral extensions, wherein said attachment means secures said system to the vehicle when in use such that said second tile surface is to be engaged with the outer skin of the vehicle.

2. The system of claim 1 wherein said distal ends of said integral extensions are to extend through the outer skin of the vehicle when in use.

3. The system of claim 1 wherein at least a portion of said distal ends is threaded for receiving an internally threaded attachment means.

4. The system of claim 1 wherein said first tile surface and said inner shield surface are positioned such that said first tile surface and said inner shield surface are not in physical contact.

* * * * *